United States Patent [19]

Thate et al.

[11] 3,912,303
[45] Oct. 14, 1975

[54] SUSPENSION SYSTEM FOR VEHICLE CAPABLE OF CROSS COUNTRY TRAVEL

[75] Inventors: Helmut Thate; Manfred Wamser, both of Karlsruhe, Germany

[73] Assignee: Dr. -Ing. Ludwig Pietzsch, Karlsruhe, Germany

[22] Filed: Jan. 28, 1974

[21] Appl. No.: 437,343

[30] Foreign Application Priority Data
Jan. 31, 1973  Germany............................ 2304728

[52] U.S. Cl. .............................. 280/124 F; 267/15
[51] Int. Cl.² ................... B60G 17/04; B60G 11/30
[58] Field of Search .................... 280/124 F; 267/15

[56] References Cited
UNITED STATES PATENTS
1,990,517  2/1935  Bedford ............................... 267/15
3,741,582  6/1973  Eckert.............................. 280/124 F
3,761,110  9/1973  Grosseau......................... 280/124 F Primary Examiner—Philip Goodman

[57]  ABSTRACT

A hydropneumatic suspension system for vehicles capable of cross country travel, such as endless chain track type tractors, wherein a fluid flow control arrangement is effective to control the movement of fluid energy between accumulators in response to signals from a motion sensor, and in which the main control valving requires only a single check valve which is actuable by the pressure difference in the hydraulic fluid reached during operation of the suspension system.

16 Claims, 9 Drawing Figures

SUSPENSION SYSTEM FOR VEHICLE CAPABLE OF CROSS COUNTRY TRAVEL

The invention relates to a suspension system for vehicles capable of cross-country travel which includes a fluid flow locking device operable by a control arrangement and serving to lock and, after phase displacement, release at least one of a plurality of serially connected springs and, interposed between the serially connected springs, a coupling mass engaged by the locking device, the springs having the form of hydropneumatic spring elements of which the hydraulic components are hydraulically coupled through a conduit, and the locking device being incorporated in the conduit for locking or releasing the fluid flow through the conduit.

In prior the art to which this invention pertains, for instance see German Pat. Application No. P 20 43 512.5, the locking device comprises two non-return valves which open in opposite directions and allow the passage of fluid in one direction only. The valves are individually opened by an auxiliary energy source means to unlock the hydraulic coupling between the two hydraulic spring elements. The locking of the hyraulic coupling is not initiated by the auxiliary source but is effected automatically by the closure of the valves when the column of liquid reverses its direction of swing. If as a result of operating conditions or of the design of the hydraulic spring elements the return swing is suppressed or weak, the two non-return valves will fail to establish the locking condition. Moreover, the known locking device is complicated and expensive for the following reasons.

The conduit must contain two non-return or check valves. Each return valve must be provided with separate means of control and operation. Owing to the high system pressures the auxiliary power required for operation is very considerable.

It is an object of the present invention to provide an improved suspension system of the specified kind. For achieving this object the invention provides that the locking device in the conduit comprises only one valve which is actuable, both for locking and for unlocking the hydraulic coupling through the conduit, by the pressure difference between the pressure maxima and minima in the hyraulic fluid, reached during operation of the suspension system.

In the suspension system according to the present invention the two check valves are replaced by a single valve and instead of this valve being operated by costly auxiliary energy it is operated by the energy which is continuously stored and released in the suspension system itself. As in the suspension system described in the German Patent Application a sensor 92 which monitors the speed at which the mass of the vehicle body swings controls the release of the hydraulic coupling between the two hydraulic springs. The locking of the hydraulic coupling is controlled by the same or a different sensor which monitors the speed of swing of the coupling mass, i.e., of the column of hydraulic fluid coupling the two spring elements, and which initiates the locking action for instance when the column has completed a half oscillation. The locking operation does not therefore depend upon the power of the return swing of the column of hydraulic fluid.

Preferably the high pressure in the suspension system is permanently applied to one side of the closure member of the valve, whereas the pressure acting on the other side of the closure member is either the low pressure or the high pressure in the suspension system selectively applied by a pilot valve.

The suspension system of the present invention is advantageously operated such that it releases the mass roughly at one of the points of oscillation reversal of the sprung mass and again locks the coupling mass approximately when this has completed a half oscillation.

The valve member of the pilot valve can be shifted into either of two end positions in one of which it establishes communication between a high pressure conduit (for locking) connected to the coupling conduit between the two spring elements and in the other between a low pressure conduit (for unlocking) connected to the coupling conduit and the valve chamber on the other side of the closure member. The pilot valve is preferably controlled by servo means so that one end of the valve piston of the pilot valve is permanently exposed to the high pressure from the high pressure conduit and the other end of the valve piston which has the larger hydraulic cross section or which is spring-loaded is selectively exposed to the high or the low pressure by a valve actuable by servo means, in such manner that application of the high pressure causes the valve piston of the pilot valve to establish communication between the low pressure conduit and the valve chamber on the other side of the closure member (for unlocking), whereas application of the low pressure causes the valve piston of the pilot valve to establish communication between the high pressure conduit and the valve chamber on the other side of the closure member (for locking).

In this arrangement it is preferred that the high pressure and the low pressure conduits terminate at opposite ends into the body of a double needle valve forming the servo-operated valve and that the double needle is adapted selectively to connect one of said conduits to a connection leading to that side of the valve piston of the pilot valve which has the larger hydraulic cross section, whereby the double acting needle blocks one opening while closing the other opening of the conduits.

The double needle of the double acting needle valve is servo-operated in response to signals obtained from at least one electronic sensor which monitors the flow rate of the hydraulic fluid in the coupling pipe between the two spring elements and the speed of swing of the vehicle body, one such signal being generated roughly at the point of motion reversal of the sprung body and causing the needle to close the entry opening of the low pressure conduit and to uncover the entry opening of the high pressure conduit, whereas another signal is generated later roughly after the column of hydraulic fluid has completed a half swing between the two spring elements and causes the needle to close the entry opening from the high pressure conduit and to open the entry of the low pressure conduit. The auxiliary power needed for operating the needle valve is negligible in relation to the pressures which arise in the suspension system because the same pressures act on each end of the double acting needle valve and the operation of the valve does not require the absolute pressure in the suspension system or a hydraulic pressure differential to be overcome. In other words, the servo energy needed for operating the valve incorporated in the hydraulic coupling conduit between the two hydraulic spring elements is practically zero.

Preferably the needle of the double-acting needle valve is operated by a solenoid which is energized in response to the above mentioned control signals. In this case the double needle can be formed on the armature of the electromagnet forming the solenoid. This permits a very compact arrangement to be designed, which includes only few components, although the electromagnet must then be accommodated inside the body of the double-acting needle valve which is filled with hydraulic fluid. This "wet" location of the electromagnet presents to problems to modern technology.

However, if it were desired to accommodate the electromagnet in a "dry" position, i.e. where it is not directly exposed to the hydraulic fluid, a preferred arrangement is to attach the double needle valve to one end of a lever which extends through a pressure-tight tube or sleeve in the valve body to the outside where it cooperates with the electromagnet.

In order to provide an overload safety device which is desirable at the very high pressures that may build up in the suspension system (14,700 psi and more) the invention offers two alternatives:

In one of these arrangements the double needle of the double needle valve is urged into its position for closing the opening of the high pressure conduit into the needle valve body by a biased overload spring which applies a thrust corresponding to a predetermined maximum pressure in the suspension system.

Alternatively, the hydraulic coupling conduit between the two hydraulic spring elements incorporates a pressure gauge measuring absolute pressure, which operates the needle in the direction of conduit opening of the high pressure line when a predetermined maximum pressure in the suspension system is exceeded.

It is a common feature of both these alternative approaches that whenever the maximum predetermined pressure in the suspension system is exceeded the hydraulic coupling is unlocked even in the absence of a signal from the sensor which monitors the speed of swing of the mass of the vehicle body, thus effecting pressure relief and a rapid collapse of the pressure peak.

In order to achieve a uniformly rapid operation of the valve constituting the locking device, it is important and desirable to have the high pressure hydraulic system permanently available for operating the valve. In an advantageous further development the invention includes a supplementary hydraulic accumulator in the high pressure conduit for continuously maintaining a supply of high hydraulic pressure ready for valve operation.

For a better understanding of the present invention, together with other and further objects thereof, reference is had to the following description taken in connection with the accompanying drawings, and its scope will be pointed out in the appended claims.

In the drawings:

FIG. 1 is a diagram illustrating a suspension system for a cross country vehicle, as described in German Pat. Application, Ser. No. P 2043512.5;

Figure 1:
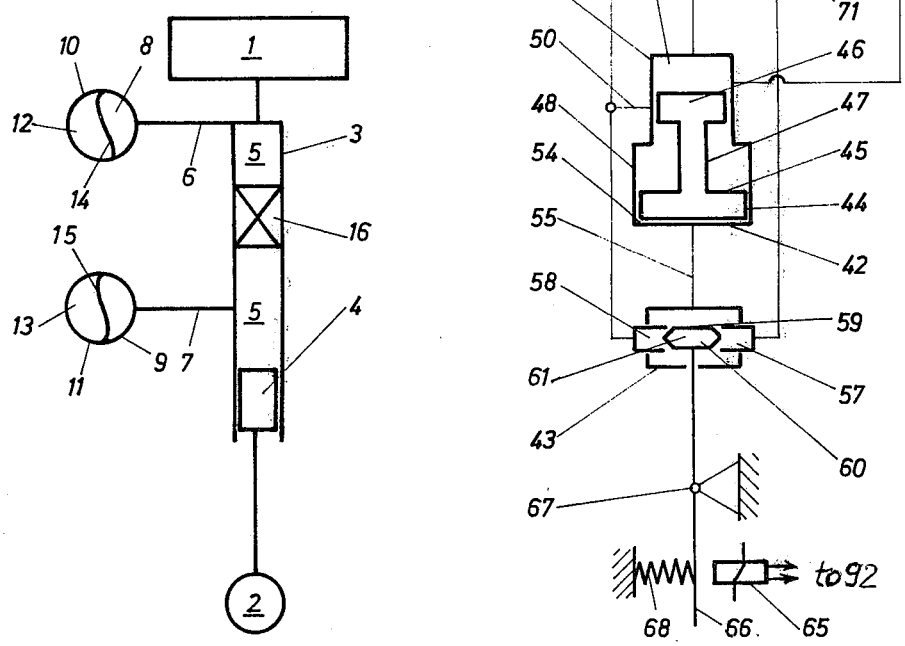

Referring now to the drawing and particularly to FIG. 1, there is shown diagrammatically a vehicle body 1 and a wheel 2 with the suspension system interposed therebetween. The vehicle is adapted to be driven on uneven terrain and may be of the double endless chain belt variety — sometimes referred to as a caterpillar-type vehicle. The suspension system includes a hydraulic cylinder 3 secured to body 1 with piston 4 of the cylinder being suitably connected to wheel 2.

The hydraulic cylinder 3 provides a pressure chamber 5 in fluid communication via conduits 6 and 7 with fluid chambers 8 and 9 of accumulators 10 and 11, respectively. The accumulators 10 and 11 include gas chambers 12 and 13, respectively, which are separated from fluid chambers 8 and 9 by means of flexible or resilient diaphragms 14 and 15. In pressure chamber 5 there is disposed a valve arrangement 16 which selectively blocks and opens the flow of fluid between chambers 8 and 9 and which is actuated by a sensor 92 responding to the oscillatory speed of the vehicle relative to direction and amplitude. The suspension system shown in FIG. 1 operates as follows:

When the vehicle is in a stationary position valve 16 is open and the chambers 8 and 9 are hydraulically connected. Slight movement of the vehicle mass 1 causes the valve 16 already to be switched to closing or blocking position. As a result, thereafter only the accumulator 11 serves as a hydropneumatic spring element, while the energy of the accumulator 10 is being stored. Movement of the vehicle over an uneven terrain causes the vehicle body mass to oscillate about the static equlibrium or neutral position with the sensor 92 determining the direction and amplitude of the speed of oscillations.

At zero value of the speed of oscillation, the sensor 92 causes the valve 16 to be opened. The pressure fluid column now begins to oscillate, due to the flow of fluid energy from accumulator 10 with an initial positioning bearing on the static neutral position and at its resonance, in cylinder 5 and conduits 6 and 7. At the end of one half oscillation of the column of hydraulic fluid, i.e. at a time when the column is at the point of motion reversal on the opposite side, the valve 16 is closed again. In the spring system described in German Pat. Application No. P 2043512.5, this was automatically effected by returning the column of hydraulic itself, whereas in the suspension system described in detail below it is likewise accomplished by reference to a signal generated by a sensor 92 (FIG. 2) measuring the speed of the swinging column of hydraulic fluid. Consequently, a corresponding amount of spring energy will again be stored in accumulator 10, but this now has the opposite effect (opposite sign) to the energy that was previously stored. The valve 16 now remains closed until the sensor again reports a change in the direction of the speed of motion of the vehicle body. The cycle of operations then repeats itself by valve 16 being reopened.

The suspension system according to FIG. 1 differs in principle from a conventional hydropneumatic suspension by including in the compression chamber 5 between the two accumulators 10 and 11 the valve 16 and by lacking shock absorption means which absorbs considerable energy when oscillations build up to major amplitudes. A vehicle equipped with the suspension system according to FIG. 1 can be driven at any speed over irregularities of a magnitude that roughly corresponds in height to the permissible amplitude of deflection without causing the body to build up oscillations that are unacceptably high. This also applies to oscillations at or near the natural frequency of the body mass.

Figure 2:
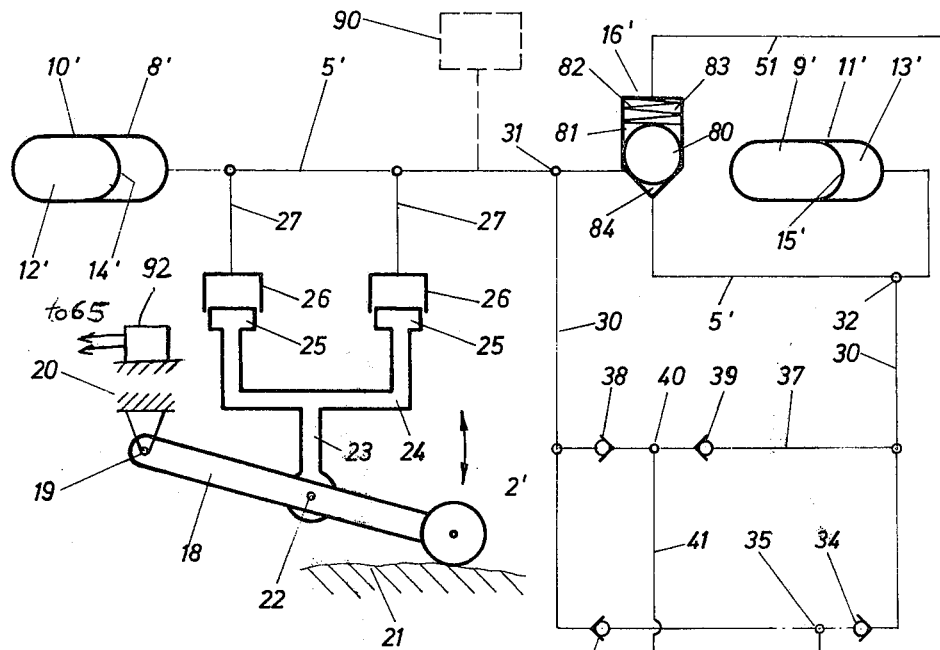
FIG. 2 is a view similar to FIG. 1 of the suspension system according to the invention.

In describing and showing the suspension system of FIG. 2, functionally equivalent parts are identified by the same reference numbers as in FIG. 1, although a prime mark has been added for further identification.

A ground wheel 2' on a cross country vehicle, for instance a track-laying vehicle such as a tractor or tank, is rotatably mounted on the free end of a swing arm 18 which is pivotably attached to the vehicle body 20 at 19. This ground wheel 2' rolls on the ground 21 when the vehicle travels. The supporting arm 23 of a fork 24 is hingeably attached to the swing arm 18 at 22. The two prongs of the fork 24 each carry a piston 25 at their upper end, each piston working in a cylinder 26 and being thereby adapted to displace the fluid of a hydropneumatic suspension system. The cylinders 26 are connected by conduits 27 to a further conduit 5' which provides coupling communication between the hydraulic chambers 8' and 9' of gas-hydraulic accumulators 10' and 11'. The accumulators 10' and 11' each contain gas-filled chambers 12' and 13' which are separated from the hydraulic chambers by yieldingly flexible diaphragms 14' and 15'.

The valve 16' is by-passed by a conduit 30 which branches off the coupling conduit 5' at 31 and rejoins it at 32. The by-pass contains two non-return valves 33, 34 which close in the direction towards the two junctions 31 and 32 and each open towards the other. Between the two non-return valves is a junction 35 with a high pressure conduit 36. A further conduit 37 which is parallel to the two non-return valves 33 and 34 contains two more non-return valves 38, 39 which open in the direction towards the junctions 31 and 32 with the by-pass 30 and each close towards the other. The portion of conduit between them contains the junction 40 of a low pressure conduit 41. Owing to the disposition of the non-return valves 33, 34 and 38, 39 in the by-pass 30 the high pressure conduit 36 will always contain the high pressure $p_{max}$ of the suspension system, whereas the low pressure conduit 41 will always contain the low pressure $p_{min}$.

Figure 3:
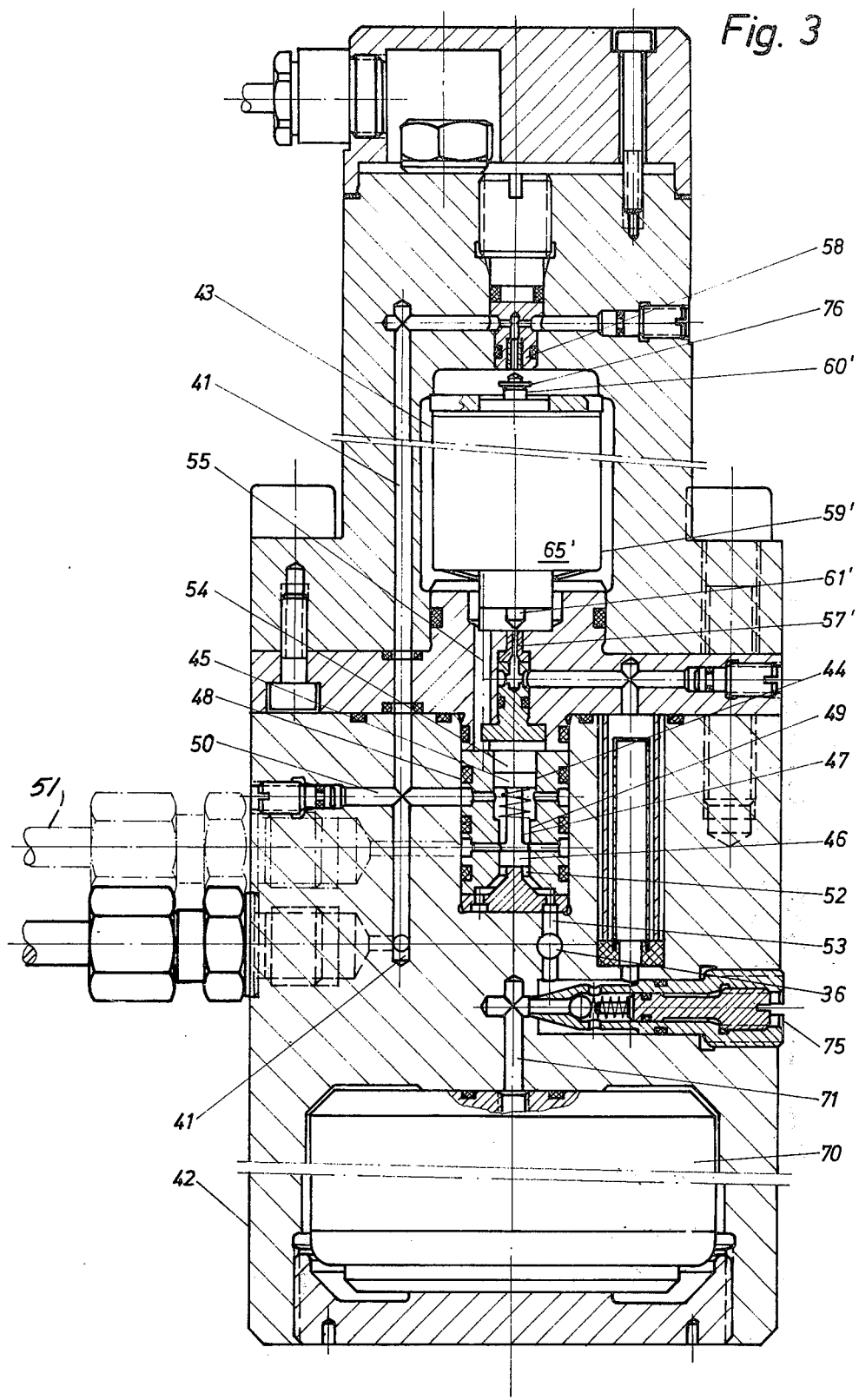
FIG. 3 is a longitudinal section of a component part of the suspension system generally according to FIG. 2.

The description which now follows refers to FIG. 3 as well as to FIG. 2. The practical design and construction of components which are only schematically shown in FIG. 2 are illustrated in greater detail in FIG. 3, the same reference numbers being used as in FIG. 2.

The high pressure conduit 36 and the low pressure conduit 41 both lead to a pilot valve 42 and a two-seated needle valve 43 for controlling the same. The pilot valve 42 is a piston valve comprising a differential valve piston 44. The differential piston 44 has two piston heads 45 and 46 of different diameters which work in sealing contact with the walls of a cylinder 48 having two portions of corresponding diameters. Between the two piston heads 45, 46 the differential piston 44 is formed with a peripheral groove 47. A branch 50 from the low pressure conduit 41 and a conduit 51 leading to a valve chamber 83 in valve 16' end at axially spaced points in the inside cylinder wall of the smaller diameter portion 49. A branch 53 of the high pressure conduit 36 enters the chamber 52 at a point facing the smaller diameter head 46 of the differential valve piston 44. Moreover, a connection 55 which communicates with the outlet of the double needle valve 43 enters the chamber 54 facing the larger diameter piston head 54 of the differential valve piston 44. The double needle valve contains two valve seats 57, 58 which alternately function as entries and of which one 57 is connected to the high pressure conduit 36 and the other 58 to the low pressure conduit 41. The double needle 59 of the double needle valve continuously operates to close one of the entires by virtue of one of the two needle ends 60 or 61 making contact with its seal 57 or 58 while the other entry remains open. According to the position of the double needle 59 either the high pressure in conduit 36 or the low pressure in conduit 41 can be allowed to enter chamber 54 of the pilot valve. The needle 59 of the needle valve 43 is operated by a servo-electromagnet 65 or 65'. The two FIGS. 2 and 3 illustrate variants of this method of operation. In FIG. 2 the electromagnet 65 is outside the needle valve 43 and not therefore exposed to the hydraulic fluid. This "dry" arrangement necessitates attaching the needle 59 to a lever 66 which must pass through the body of the needle valve 43 to the outside through a pressure-tight seal, for instance in the form of a flexible sleeve, not shown. The fulcrum of the lever 66 is located at 67 between the needle 59 and the electromagnet 65 which is operatively opposed by a spring 68. The electromagnet 65 is energized in response to a signal received at the instance in time defined, with reference to FIG. 1, by a sensor 92 which measures the speed of swing of the sprung mass of the body 20 of the vehicle or the speed of motion of the swinging column of hydraulic fluid in conduit 5'.

In the variant illustrated in FIG. 3 the electromagnet 65' is integrated with the valve needle 59, the needle ends 60' and 61' being attached to the ends of the longitudinally movable magnet itself. The arrangement in FIG. 3 requires no lever nor a complicated pressure-tight resilient sleeve for its passage through the body of the double needle valve 43. On the other hand, the magnet 65' must be entirely encapsulated and sealed from the high pressure fluid in the suspension system. However, the two arrangements in FIGS. 2 and 3 are in principle essentially identical. An auxiliary pressure accumulator 70 is also needed, which is connected by a branch conduit 71 to the high pressure conduit 36, and which ensures that a store of hydraulic fluid at the high pressure of the system is available for instantaneously building up high pressure in chamber 54 of the pilot valve when the needle 59 uncovers the seal 57 and opens communication between the high pressure conduit 36 and the outlet connection 55 of the double needle valve 43.

The constructional design shown in FIG. 3 comprises the pilot valve 42 and the double needle valve 43 together with the supplementary accumulator 70 in one compact assembly. The design is calculated to withstand very high pressures rising to 14,700 psi and even more. The differential cylinder 48 in FIG. 3 consists of a sleeve which contains two coaxial bores of different diameters for the accommodation of the differential piston 44. These bores communicate with the conduits 50 and 51 through transverse ducts not provided with reference numbers in FIG. 3, and peripheral grooves in the outside circumference of the sleeve sealed by O-rings, likewise not identified by reference numbers. The hydraulic accumulator 70 is connected to the high pressure inlet 57 and to chamber 52 of the pilot valve with the interposition of a flow restricting non-return valve not shown in FIG. 2. This flow restricting check valve 75 is intended to prevent a rapid discharge of the accumulator 70 and hence a sluggish response of the valve 16'.

The valve 16' is not integrated in the design illustrated in FIG. 3. The closure member of valve 16' in the form of a ball 80 is movable in tightly sealing contact with the walls of a bore 81 in the valve body and is loaded by a compression spring 82. This spring 82 is contained in the space 83 which remains at the back of the ball 80 inside the valve body 16', and which communicates through a conduit 51 with the pilot valve 42. The space on the other side of the ball 80 communicates with that branch of the coupling conduit 5' which leads to the gas-hydraulic accumulator 11'. Finally that part of conduit 5' which is connected to the gas-hydraulic accumulator 10' communicates with a further intermediate space which is divided off from the two spaces 83 and 84 by the ball 80 when this is in closing position, but which forms an extension of space 84 when the ball 80 is in open position. The valve 16' is operated by the pilot valve and needle valve assembly in the following way:

The needle 59 of the needle valve 43, when in its seat 57, closes the connection to the high pressure pipe 36. In this position communication exists between the low pressure pipe 41 through the uncovered seat 58 of the double needle valve 43 and its outlet connection 55 to chamber 54 of the pilot valve. The piston head 45 is thus exposed in chamber 54 to the low pressure, whereas the smaller diameter piston head 46 continues to be exposed to the high pressure entering chamber 52 from the high pressure conduit 36 through the branch 53. The faces of the two piston heads 45 and 46 are so matched that the resultant force acting on the piston 44 will be downwards in FIG. 2 and to the left in FIG. 3, retaining the piston in one end position. In this end position, which is that shown in FIG. 2, the high pressure conduit 36 is placed into communication with conduit 51 which leads from the side of the smaller diameter bore 49 of the cylinder 48 to the space 83 in valve 16'. The back of the ball 80 is thus exposed to high pressure acting in the same direction as the thrust of the precompressed spring 83, but the same high pressure will also exist in space 84. The ball 80 is therefore pushed into closing position in which it cuts off the coupling conduit 5' and separates the two gas-hydraulic accumulators 8' and 11'. In this position spring action is controlled exclusively by the "free" accumulator 10' whereas the "controlled" accumulator 11' is completely eliminated from the system. Let it now be supposed that the electromagnet 65 or 65' is energized by a signal from the sensor 92 which monitors the speed of swing of the vehicle body, then the electromagnet will change the position of the valve needle 59 by lifting it off its seat 57 and moving it into its seat 58. This admits the high pressure from the high pressure pipe 36 through the uncovered seat 57 and the outlet conduit 55 into the chamber 54 of the pilot valve 42. High pressure will therefore now be applied to both the faces of both piston heads 45 and 46 of the differential piston 44 and, since the diameter of piston head 45 exceeds that of piston head 46, the differential piston 44 will shift upwards in FIG. 2 and to the right in FIG. 3, into its alternative end position which is that shown in FIG. 3. In this end position the differential piston provides communication through the clearance between the cylinder bore and the base of the groove 47 from branch 50 of the low pressure conduit 41 to conduit 51 leading to the space 83 in valve 16', so that the pressure in this space will now drop to low pressure. The high pressure in space 84 can now overcome the combined countervailing thrust of the low pressure and of the spring 82 on the back of the ball 80 for opening the valve 16', establishing communication between the two hydraulic accumulators 10' and 11' through the coupling conduit 5' and space 84 in the valve; the "controlled" accumulator 11' thus ceases to be cut off. By virtue of the described arrangements the locking action of the valve 16', i.e. the closing of the valve, and its unlocking action, i.e. the opening of the valve 16', take place within very short times amounting to only fractions of the time taken for the completion of a full oscillatory cycle of the column of hydraulic fluid. It is thus possible for the unlocking action and the following locking action to take place without any undesirable delay following the receipt of the unlocking signal when the speed of swinging motion of the vehicle body mass is zero and following the receipt of the locking signal for locking again when the column of hydraulic fluid between the two hydraulic chambers 8' and 9' of the accumulators has completed a half oscillation.

Unlocking should also take place in the absence of a signal from the sensor 92 when the pressure in the described suspension system exceeds a maximum permissible value.

Figure 4:
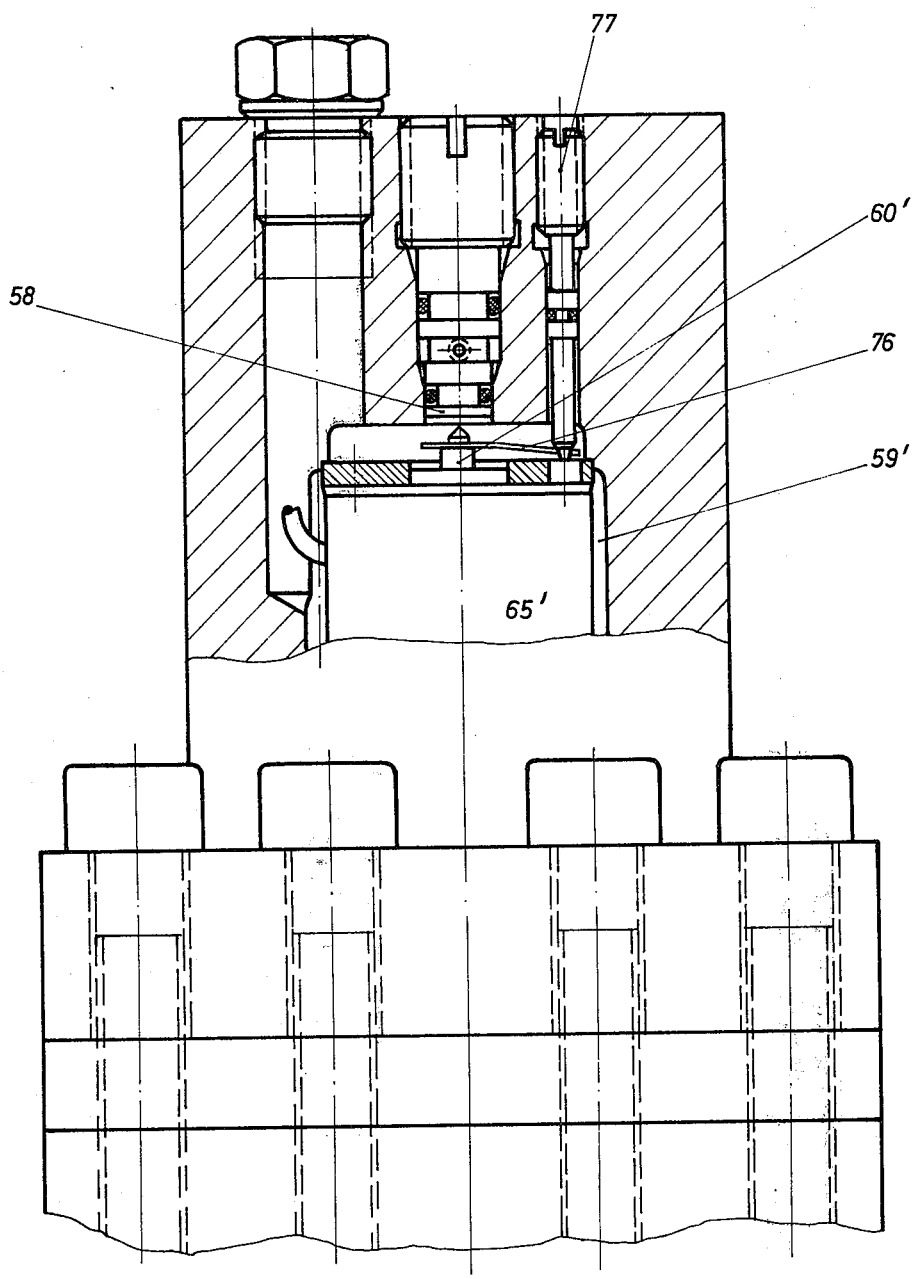
FIG. 4 is an enlarged, fragmentary, view taken at right angle of the part shown in FIG. 3.

For this purpose there is provided in FIGS. 3 and 4 an overload spring 76 in the form of a leaf spring which has a bifurcated end attached to the needle point 60' of the valve needle 59', whereas the other end is kept under tension by a set screw 77. The spring 76 urges the other end 61' of the valve needle into its seat 57, the biasing pressure of the spring corresponding to the maximum permissible pressure in the suspension system. When this pressure is exceeded it will overcome the bias of the overload spring 76 and lift the needle 59' out of its seat 57, thus admitting high pressure into chamber 54 of the pilot valve 42 and causing the differential piston 44 to be shifted into its right hand end position in FIG. 3. Consequently the low pressure conduit 41 will be placed into communication through branch 50, the groove 47, and conduit 51, with space 83 in the control valve, allowing the high pressure in space 84 to open the ball 80. The system is thus unlocked and the pressure in the suspension system relieved.

Protection against excessive pressure could also be achieved by the following alternative:

The absolute pressure existing in the coupling conduit 5' is measured by a pressure gauge 90 shown in dotted outlines in FIG. 2 and connected to the conduit by a branch between the "free" accumulator 10' and the valve 16'. When this absolute pressure exceeds a maximum permissible level the pressure gauge causes the electromagnet 65 to be energized and the seat 57 to be uncovered to admit low pressure, as described, into the space 83 in valve 16' and thereby to open the valve 16'.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A suspension system for vehicles capable of cross country travel comprising:
a plurality of hydropneumatic spring elements having hydraulic chambers;
a conduit including a coupling conduit serially connecting said elements;
a fluid flow control device in said conduit effective in response to control signals to hydraulically connect the chambers of said spring elements by unlocking said conduit at a predetermined moment of the swinging motion of the spring vehicle body and, after phase displacement of the swinging motion of the hydraulic fluid swinging between these spring elements, to disconnect said elements by locking said conduit, said flow control device comprising a single valve means actuable for locking said conduit by the high pressure and for unlocking said conduit by the low pressure of the fluid pressures in said conduit during operation of the suspension system, whereby said valve is effective to respond to the pressure difference within the system.

2. A suspension system according to claim 1, wherein the high fluid pressure ($p_{max}$) within said conduit is permanently applied to one side of a closure member of said single valve, the system comprising a pilot valve in fluid communication with said control device effective to selectively apply the high or the low fluid pressure to the opposite side of said flow control device within said conduit.

3. A suspension system according to claim 2, wherein said pilot valve includes a valve member displaceable into either of two end positions in one of which it establishes communication between a high pressure region in said conduit connecting to the coupling conduit blocking fluid flow between the two springs elements and in the other position establishes communication between a low pressure region in said conduit connecting to the coupling conduit for releasing fluid flow to effect unlocking.

4. A suspension system according to claim 3, wherein said high pressure region and the low pressure region are tapped off a common by-pass of said conduit which itself branches off said coupling conduit and by-pass said control valve, and a first junction between said high pressure region and said by-pass located between two check valves which are open towards the said first junction, and a second junction between the low pressure region and said by-pass located between two check valves which open away from said second junction.

5. A suspension system according to claim 3 wherein said pilot valve is a piston valve comprising a differential valve piston provided with a circumferential groove, said piston valve establishing one of two connections in each of its two end positions of displacement.

6. A suspension system according to claim 3, wherein one end of the piston valve of said pilot valve is permanently exposed to high fluid pressure from the high pressure region and the other end of the valve piston has a comparatively larger hydraulically effective cross section and a servo operated valve for selectively exposing the latter end of the piston valve to either high or fluid low perssure in such a manner that application of the high pressure causes the valve piston of said pilot valve to establish communication for fluid release between the low pressure region and said opposite side of the closure member, whereas application of the low pressure causes the valve piston of the pilot valve to establish communication between the high pressure region and said opposite side of the closure member for fluid locking.

7. A suspension system according to claim 6, and spring means biasing the said other end of the valve piston.

8. A suspension system according to claim 6, wherein said servo-operated valve includes a double needle valve having a body with two openings, said high pressure region and said low pressure region each connecting separately to one opening on opposite sides of said body; said double needle being adapted to selectively connect one of said conduit regions to that side of the valve piston of the pilot valve which has the larger hydraulic cross section, the double needle being effective to open one opening while closing the other.

9. A suspension system according to claim 2 wherein the closure member has a generally identical hydraulically effective cross section at its two sides and a spring acting upon said opposite side of said closure member.

10. A suspension system according to claim 8, and at least one electronic sensor effective for monitoring the speed of swing of the vehicle body, wherein the double needle of the doubleacting needle valve is servo-operable in response to a first signal obtained from said electronic sensor, said first signal being generated roughly at the point of motion reversal of the sprung body for causing the needle to close the opening of the low pressure conduit and to uncover the opening of the high pressure conduit, whereby the closure member opens and therefore connects the hydraulic chambers of the two spring elements, whereas a second signal is generated later roughly after the column of hydraulic fluid has completed a half swing between the two spring elements by the same or a different sensor monitoring the flow rate of the hydraulic fluid in the coupling conduit between the two spring elements, said second signal causing the needle to close the opening from the high pressure conduit and to open the opening of the low pressure conduit, whereby the conduit is locked and the spring elements are disconnected.

11. A suspension system according to claim 10 wheren said servo-operated valve needle member includes an electromagnet which is energized in response to said first and second signals.

12. A suspension system according to claim 11, wherein the valve needle member itself forms the armature of the electromagnet.

13. A suspension system according to claim 11, and a lever, one end thereof being connected to said valve member and the other end being structurally associated with said electromagnet of said servo-operated valve.

14. A suspension system according to claim 11, wherein said double needle of the double needle valve is urged into its position for closing said high pressure region into the needle valve body by an overload spring which applies a thrust corresponding to a predetermined maximum pressure in the suspension system.

15. A suspension system according to claim 11, and a pressure gauge in the coupling conduit, between the two spring elements for measuring absolute pressure, for actuating the needle member in the direction of the opening of the high pressure region when a predetermined maximum pressure in the suspension system is exceeded.

16. A suspension system according to claim 15, and a supplementary hydraulic accumulator in fluid communication with said high pressure region and in which hydraulic fluid under high pressure is continuously kept in readiness for operating said pilot valve.

* * * * *